United States Patent [19]

Johnson

[11] Patent Number: 5,326,458
[45] Date of Patent: Jul. 5, 1994

[54] LIQUID SKIMMING SYSTEM

[76] Inventor: Alexander D. Johnson, 2008 Woolner Ave., Fairfield, Calif. 94533

[21] Appl. No.: 968,906

[22] Filed: Oct. 30, 1992

[51] Int. Cl.$^5$ ............................................. C02F 1/40
[52] U.S. Cl. ................................. 210/122; 210/170; 210/242.3; 166/265
[58] Field of Search ................... 210/122, 242.3, 242.4, 210/170, 923, 924; 166/265

[56] References Cited

U.S. PATENT DOCUMENTS

| | | | |
|---|---|---|---|
| 3,667,608 | 6/1972 | Burroughs et al. | 210/242.4 |
| 4,663,037 | 5/1987 | Breslin | 210/242.3 |
| 4,761,225 | 8/1988 | Breslin | 210/242.3 |
| 4,872,994 | 10/1989 | Jakob | 210/170 |
| 4,974,674 | 12/1990 | Wells | 210/242.3 |
| 5,058,669 | 10/1991 | Wells | 210/242.3 |
| 5,207,897 | 5/1993 | Baird et al. | 210/242.3 |

Primary Examiner—Christopher Upton
Attorney, Agent, or Firm—Townsend and Townsend Khourie and Crew

[57] ABSTRACT

A skimmer assembly for use in a well has a shielded float/filter assembly with a hydrophobic/oleophilic filter element, which permits selective passage of lighter than water liquids, such as oil or other hydrocarbons, to the inlet of a pumping assembly. The pumping assembly is provided with two pumps: a lower pump for pumping the lighter than water liquid to the surface of the earth, and an upper pump for pumping water in the well to the surface of the earth. Each pump is operated by a common logic valve, to which compressed air is supplied and which regulates the application of compressed air to the upper side of a diaphragm in each pump. The lower side of the diaphragm is forced upwardly by means of a spring arranged within the pumping volume of the pump housing and a backing plate positioned just below the diaphragm. A bias spring between the backing plate and a centrally located inlet valve function to close the valve from the inlet to the pump. The logic valve provides an adjustable pumping cycle and incorporates a poppet valve and a pilot leading to an adjustable metering valve. The skimmer assembly can be left in situ for extended periods of time without deterioration in the pumping operation. Because the pump has its controlling logic built-in, there is no need for complicated above ground pump controls.

14 Claims, 7 Drawing Sheets

SKIMMER
ATTACHMENT

SKIMMER
ATTACHMENT

PUMP IN
FILL MODE

VALVE IN
EXHAUST/FILL
MODE 5,326,458

LIQUID SKIMMING SYSTEM

BACKGROUND OF THE INVENTION

This invention relates to hydrocarbon recovery systems, and more specifically, to systems for recovering floating hydrocarbons such as gasoline or oil from wells.

In the recent past there has been an increased public awareness of the effects of pollution in our environment. This has lead to a great deal of legislation being passed to clean up pollution. One area of our environment that is being polluted is groundwater through the leakage of piping and tanks containing petroleum by-products (e.g., oil). Water will dissolve only small amounts of oil. Therefore, if oil is present in significant amounts, it will form a separate phase, forming a pool of oil on top of the water table. When this is detected, the law generally mandates that a program to remove the oil be initiated immediately, followed by a program to remediate the contaminated groundwater.

A common method of removing the oil is to hand bail the well. This is neither practical nor cost effective on an ongoing basis.

Another method of removing the oil is to position a pump in such a manner that it draws liquid from near the top of the water table. This is known as a total fluids pumping system. The theory is that the oil recovery rate can be increased by drawing down the water table into a "cone of depression". The oil then flows down the surface of this cone of depression into the pump inlet. This method requires the installation of expensive above ground oil/water separation equipment and subsequent treatment of large quantities of water before it can be discharged. Another problem with this method, is that when the pump(s) are periodically turned off, the water table recovers to it's original level. This "smears" the oil through the soil and further contaminates the groundwater. This method does remove the contaminated groundwater, but the presence of the free phase continues to contaminate the groundwater as it is being pumped.

Yet another method of removing the oil is by using a method referred to as a specific gravity skimmer. This method calls for the placement of a pump with a floating inlet down the well. The specific gravity of the float is greater than oil and less than water. Therefore, the inlet is just above the water. This method is typically capable of removing the oil down to a thickness of from about one-half to about one-quarter inch. The float can then be weighted to be just below the oil/water interface and pump both oil and water with the same problems as the total fluids system mentioned above.

One potential problem with skimming systems is the donut effect theory. This theory states that if the oil layer is thick enough, the water table will be depressed due to the weight of the oil. If the oil in the well is pumped out, the water table near the well will rebound. Since the specific gravity of oil is typically about 0.75, the water table will rebound by an amount equal to about three-quarters the thickness of the oil layer. This local rebound is referred to as the donut and slows the recovery of oil. The way around this is to pump total fluids or to use a two pump system. In the two pump system, a second groundwater pump is placed below the skimmer to depress the water table and enhance the oil recovery. This allows down well oil/water separation. It also requires a water treatment system and often a larger well.

SUMMARY OF THE INVENTION

The invention comprises a skimming system which is devoid of the above-noted disadvantages of known systems and which selectively removes lighter than water liquids (such as oil) from a fluid in which the assembly is immersed and provides separate paths to surface mounted equipment used to treat the water and the separated lighter than water liquid.

A main housing containing a float/filter assembly and a compressed air operated pumping assembly is provided with a plurality of valved fluid inlet and outlet orifices. One pair of the fluid orifices serves as an inlet connection to a source of compressed air and as an outlet to the atmosphere for the used air. Another pair of the fluid orifices serves as liquid outlets for water and the lighter than water liquid emanating from the skimming system. The pumping assembly within the main housing is controlled by an adjustable, compressed air operated logic valve. The float/filter assembly is positioned within the main housing below the pumping assembly and has a liquid outlet coupled to a pump inlet in the pumping assembly.

An outer slotted shield, preferably in the form of a cylindrical tube, is fastened within the main housing, preferably to the pump assembly. Slidably arranged within this protective shield is a float having a hollow interior and a central passageway terminating at the liquid outlet of the float/filter assembly. A filter is mounted to the float and has a pair of end caps capturing a replaceable filter element, which provides an inner volume. The filter element has hydrophobic and oleophilic characteristics which prevents water from passing through the filter element to the interior of the filter, while permitting the lighter than water liquid (typically oil or some other hydrocarbon) to pass freely into the interior volume of the filter. The upper end cap has a overflow orifice in fluid communication with the inner volume of the filter to accommodate an overflow condition in which the thickness of the lighter than water liquid is greater than the height of the upper end cap on the filter when the float is suspended in the liquid. The lower end cap of the filter has an aperture in fluid communication with the central passageway of the float so that lighter than water liquid entering through the membrane or via the overflow orifice is communicated via the central passageway, the liquid outlet and a flexible tubing to the pump inlet. The tubing is arranged in such a manner as to provide limit stops for upward and downward travel of the float/filter assembly within the shield.

The pumping assembly in the preferred embodiment comprises a pair of pumps: a first pump coupled via the tubing to the outlet of the float/filter assembly, and a second pump coupled to another tubing element which is arranged within the skimming system main housing, preferably below the lower end of the shield, to draw water from below the lighter than water liquid. Each pump in the pumping assembly includes a housing having appropriate fluid paths, and an internal pump volume provided with a spring loaded valve element positioned below a pumping diaphragm. The valve element cooperates with an inlet valve seat and is biased by means of a relatively light spring to a closed position. A backing plate has a centering mechanism, preferably comprising a relatively heavy return spring received in the pumping chamber around the valve element and in contact with the backing plate. The backing plate is positioned between the return spring and the associated diaphragm. The backing plate has a relatively large surface area to distribute the force applied by the return spring to the diaphragm. The internal pump volume in the pump housing is coupled to a dedicated outlet via internal fluid paths which pass upwardly through the various pump housing elements to one of the liquid outlets in the skimming system main housing. A check valve is interposed in each liquid outlet flow path below the main housing outlet but above the diaphragm, with the ball element of the check valve having sufficient freedom of movement toward the main housing outlet to permit the passage of solid contaminants thereby. The limit stop for the ball element preferably comprises a strip of suitable inert material, such as stainless steel, secured in any convenient manner to the main housing outlet fitting.

A logic valve is mounted in an upper portion of the pumping assembly, the logic valve having an internal poppet valve with appropriate valve seats to provide a two-state operating cycle. An adjustable metering valve is provided to enable the length of the logic valve cycle to be varied.

The skimming system operates on the combined action of the compressed air regulated by the logic valve and the return springs provided within each pump assembly. Once installed, the apparatus may be left in place for long periods of time, and is effective in withdrawing the lighter than water liquid and the water to the surface of the earth for storage and further treatment. Since the power is supplied by compressed air, the system is non-hazardous and non-polluting. The filter element is easily replaced when replenishment is needed, and the float/filter assembly is operable even when the orientation of the main housing deviates from true vertical. Further, the pumping action is readily adjustable by virtue of the logic valve design.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
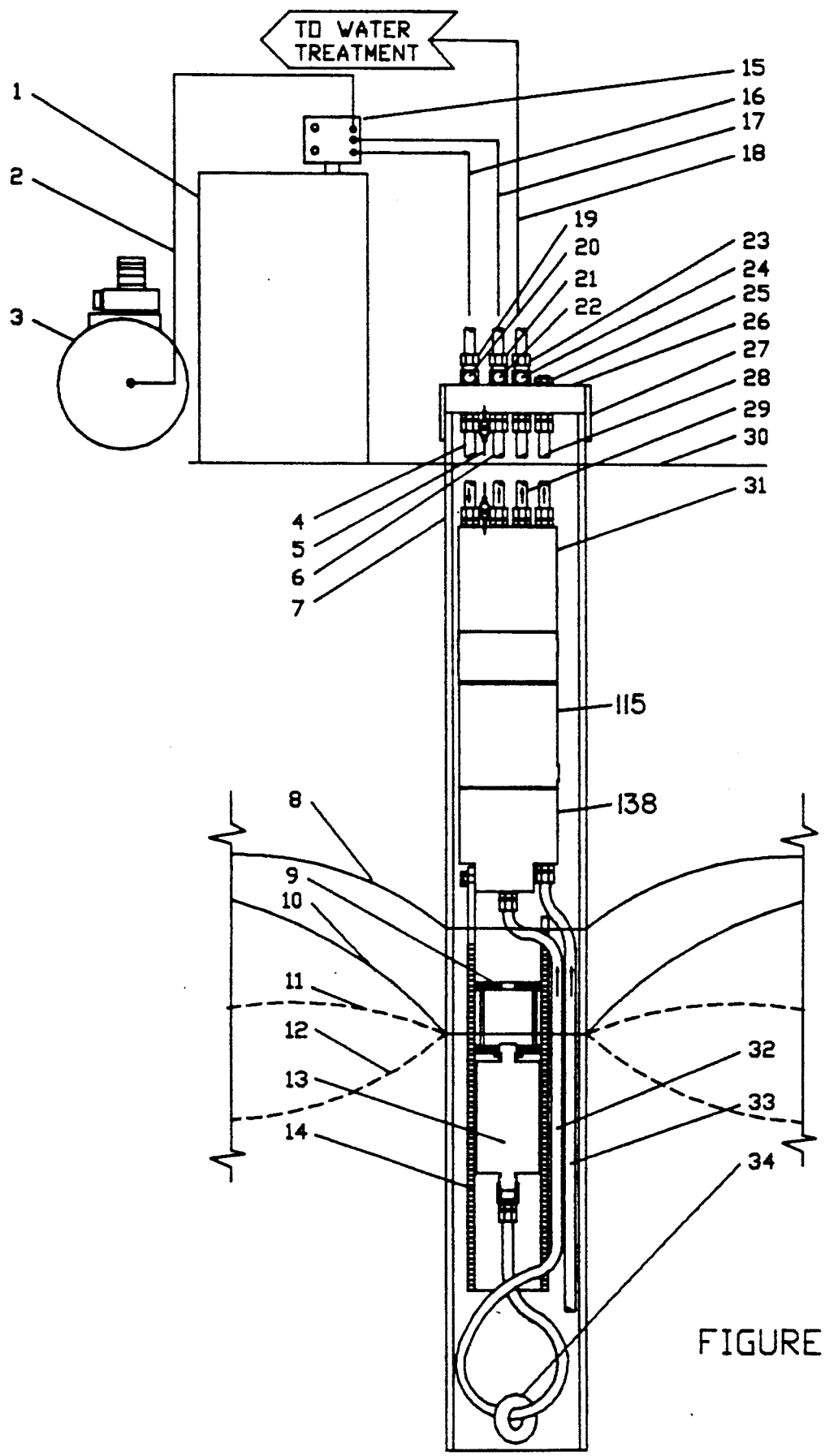
FIG. 1 is a drawing illustrating a skimming system incorporating the invention.

The power source for the pump is compressed air supplied by an air compressor 3. Air is conveyed to through piping or hose 2 to a shut off assembly 15. The shut off assembly 15 interrupts the flow of compressed air to the skimmer if the recovered oil collection tank 1 is full, to prevent overfilling the tank. If the tank is not full and the system is on, compressed air is conveyed to the skimmer pump via piping 16, a pair of quick connects 19 and 20, and hose 4. The quick connect 19 is a single end shut off type. Therefore, air is prevented from blowing out pipe 16 when quick connect 19 is separated from quick connect 20. The exhaust air is vented outside the well casing 7 through a well cap 26. The well cap 26 is sealed using a rubber boot 27 which prevents foreign material from entering and further contaminating the well.

Oil 8, 11 that has accumulated on top of the water table 10, 12 is free to pass through the well casing 7, which is perforated, into the well. Oil that enters into the well is free to pass through a slotted guide tube 14. Any oil layer thicker than a sheen will be drawn through a filter 9, through a central passage in a float assembly 13, and into the pump 31 by way of a hose 32. The pump forces the oil out discharge hose 6 to the well cap 26 and quick connects 21 and 22. Quick connects 21 and 22 are of a double shut off type. The shut off in quick connect 21 prevents oil in hose 17 from draining when quick connects 21 and 22 are separated. The shut off in quick connect 22 prevents oil in hose 6 from running out in the event the skimmer needs to be removed from the well. Oil passes from quick connect 21 through hose 17 to the oil collection tank 1 to be disposed of when the tank is full. Safety cable 5 supports the weight of the skimmer so that the skimmer is not suspended primarily by the hoses.

The pump may include either one or two pump heads. When the pump is configured with a single pump head 138, a thick layer of oil 11 near the well will be pumped off. Because the specific gravity of oil is about 0.75, the water 12 near the well maw rebounds about $\frac{3}{4}$ the thickness of the original oil layer. This rebound of the water table—termed the "donut effect"—can cause a partial barrier to the flow of oil.

When the pump is configured with two pump heads 138 and 115, the "donut effect" is prevented because the water table 10 is drawn down into a cone of depression. This cone of depression enhances the flow of oil 8 into the well by causing a downhill gradient.

Figure 2:
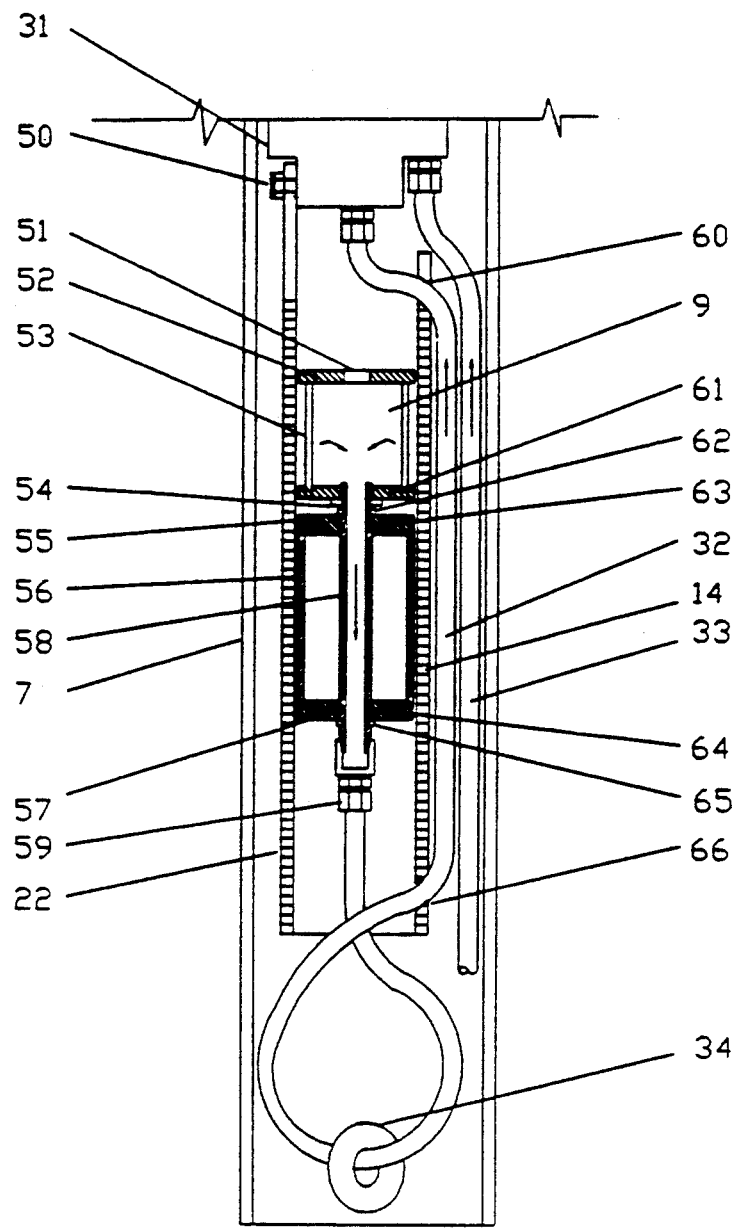
FIG. 2 is an enlarged cross-section of the float assembly and filter of the system of FIG. 1.

As best seen in FIG. 2, the float assembly 13 is comprised of an outer tube 56, two end plugs 55, 57 and a pipe 58 that passes through the center forming a sealed cavity. The outer tube 56 is preferably made of clear plastic to provide easy inspection. The end plugs 55 and 57 are bonded into the outer tube 56 and are also preferably made of a plastic material. The pipe 58 has pipe threads cut into the lower end for attaching a hose fitting 59. Four O-ring grooves are cut into the float pipe 38 and fitted with O-rings. O-rings 63 and 64 provide a seal between the float pipe and the end plugs. O-rings 62 and 65, which are larger in cross section than O-rings 63 and 64, prevent the float pipe from slipping up or down in relation to the rest of the float assembly 13. Another groove is cut into the float pipe to hold and seal a filter grommet 54. A stainless steel washer 34 hangs on hose 32 to prevent the hose from getting tangled or sticking to the wall of the well as the skimmer assembly is being lowered into the well or as the water table fluctuates. Hose 32 passes through holes 60 and 66 in guide tube 14 to allow for free travel of the float/filter assembly. The hose passing through hole 66 provides a lower limit so that the float cannot slip out of the bottom of the guide tube 14. The guide tube 14 is attached to the pump by means of two bolts 50 (only one of which is illustrated) threaded into the pump body 31. The slotted guide tube 14 keeps the float/filter assembly upright and free from obstructions in the well while allowing the free passage of water and oil.

The filter 9 is a replaceable unit that comprises two end caps 52 and 61 with a pleated paper wall portion 53 captured by the end caps. The lower end cap 61 has a rubber grommet 54 in the center that attaches to the float pipe 58. The paper wall portion 53 of the filter 9 is treated so that it will repel water while allowing oil to pass through. Any oil that succeeds in entering the filter is taken through float pipe 58 and hose 32 to the pump 31. The buoyancy of the float is designed so that the oil/water interface will be part way up the paper wall portion 53 of the filter 9. The upper end cap 52 has a large hole 51 in the top that allows oil to pass directly into the interior of the filter 9 whenever the oil layer is thick or deep enough to overflow upper end cap 52. Another function of the hole 51 is to allow air to enter the filter. When there is no oil to be pumped, the suction of the pump could overpower the water repelling nature of the paper filter, thereby drawing in water. This is prevented by allowing air to enter the filter through hole 51.

Figure 3:
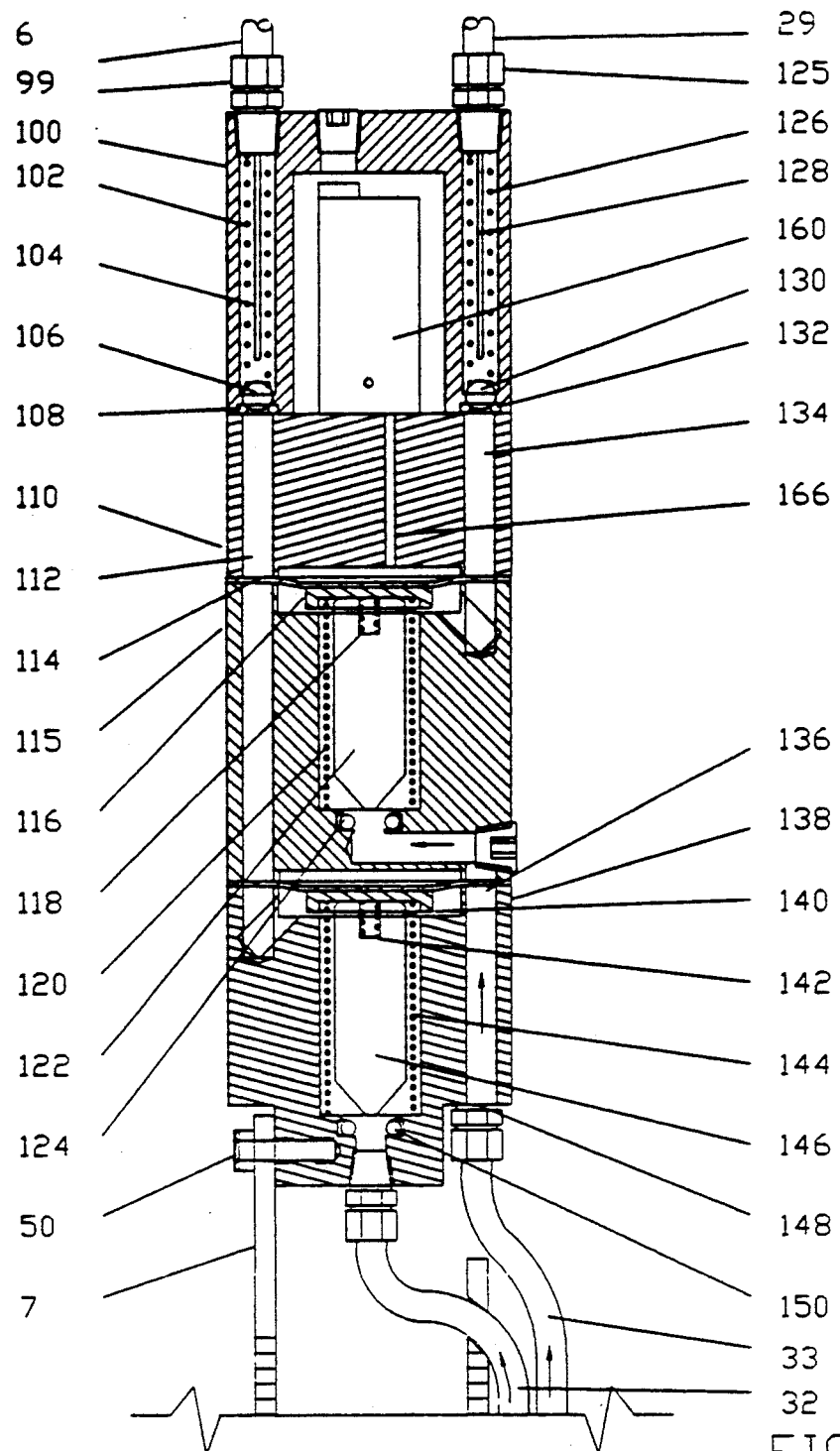
FIG. 3 is an enlarged cross-section of the pump assembly, showing the liquid flow path in the suction/filling mode.

With reference to FIG. 3, which illustrates the fill mode of operation, the force that draws oil and water into the pump is supplied by a pair of springs 144 and 120. The spring force is transmitted to associated backing plates 140 and 116 which spread the force out over most of the surface area of a pair of diaphragms 136 and 114. Another function of the backing plates 140, 116 is to protect the diaphragm from any sharp edges the springs 144, 120 might have. Another function of the springs 144, 120 is to maintain the central location of the free-floating backing plates 140, 116 on the associated diaphragms 136, 114. As a diaphragm is forced upward by the associated spring, air is displaced through a port 158 shown in FIG. 5 and exhausted through a valve 160. Valve 160 is a commercially available design sold by Aro Company of Bryan, Ohio as a model 59890 vibrator valve. At the same time, oil is drawn into pump head 138 from hose 32, and water is drawn into pump head 115 through hose 33, lifting check valves 146 and 122 off their associated O-ring seats 150 and 124. The check valves 146 and 122 are limited in their movement by the backing plates 140 and 116. The check valves are spring loaded by means of springs 142 and 118, insuring that they will close quickly. The check valves 146 and 122 are sized to minimize the dead space in the pump chamber that is not affected by the diaphragm travel. By minimizing the dead space in the pump chambers, the achievable suction when the pump head is full of air is maximized. This is due to the compressible nature of air. While in the suction/filling mode, a pair of check valves 106 and 130 are drawn down tightly on associated O-rings 108 and 132 to provide a fluid seal, preventing fluid from back flowing into the pump head through hoses 6 and 29. The lower diaphragm 136, which is preferably of the nylon-reinforced VITON type, serves as a gasket surface between pump head 138 and pump head 115 and forms a seal around ports 112 and 136. The upper diaphragm 114 serves as a gasket surface between pump head 115 and the valve base 110 and forms a seal around ports 112 and 134. O-rings 108 and 132 also seal ports 112 and 134 between base 110 and upper housing member 100. The nature of the check valves 106, 130 allows the pump to pass large solids. The spring return diaphragms 114, 136 and check valves 122, 146 make the pump able to run dry and still have excellent self priming characteristics.

Figure 4:
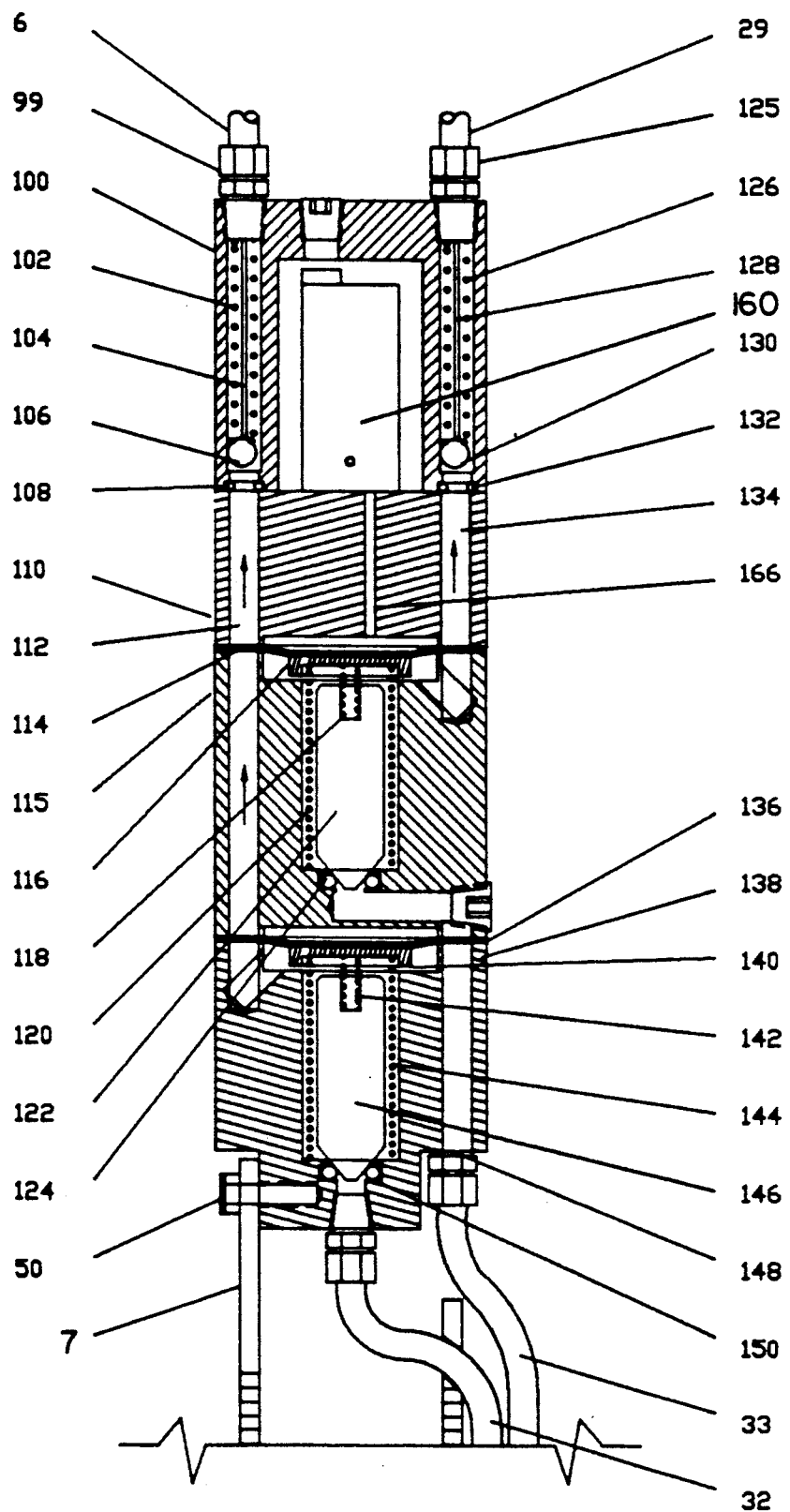
FIG. 4 is an enlarged cross-section of the pump assembly, showing the liquid flow path in the discharge mode.

With reference to FIG. 4, which illustrates the discharge mode of operation, during the discharge mode compressed air is delivered from valve 160 through a port 158 (see FIG. 5) to the upper side of diaphragms 136 and 114. Oil and water that is displaced by the diaphragms 136 and 114, respectively, forces check valves 146 and 122 against their O-ring seats 150 and 124 preventing fluid from back flowing through hoses 32 and 33. Therefore, the oil must pass through port 112 and the water must pass through port 134 lifting check valves 106 and 130 off of their O-ring seats 108 and 132 and out discharge hoses 6 and 29, respectively. A strip of heavy gage stainless sheet metal 104 and 128 is placed in ports 112 and 134 to act as an upper limit stop for check valves 106 and 130. This prevents the fluid from lifting the ball up against hose fittings 99 and 125 thereby stopping the flow of fluid. Ball stops 104 and 128 also prevent vortex flow, which would otherwise slow the flow of fluid. Each ball stop 104, 128 is arranged as a sliding fit in springs 102 and 126. Hose fittings 99 and 125 prevent the ball stops 104, 128 from being pushed upward.

Figure 5:
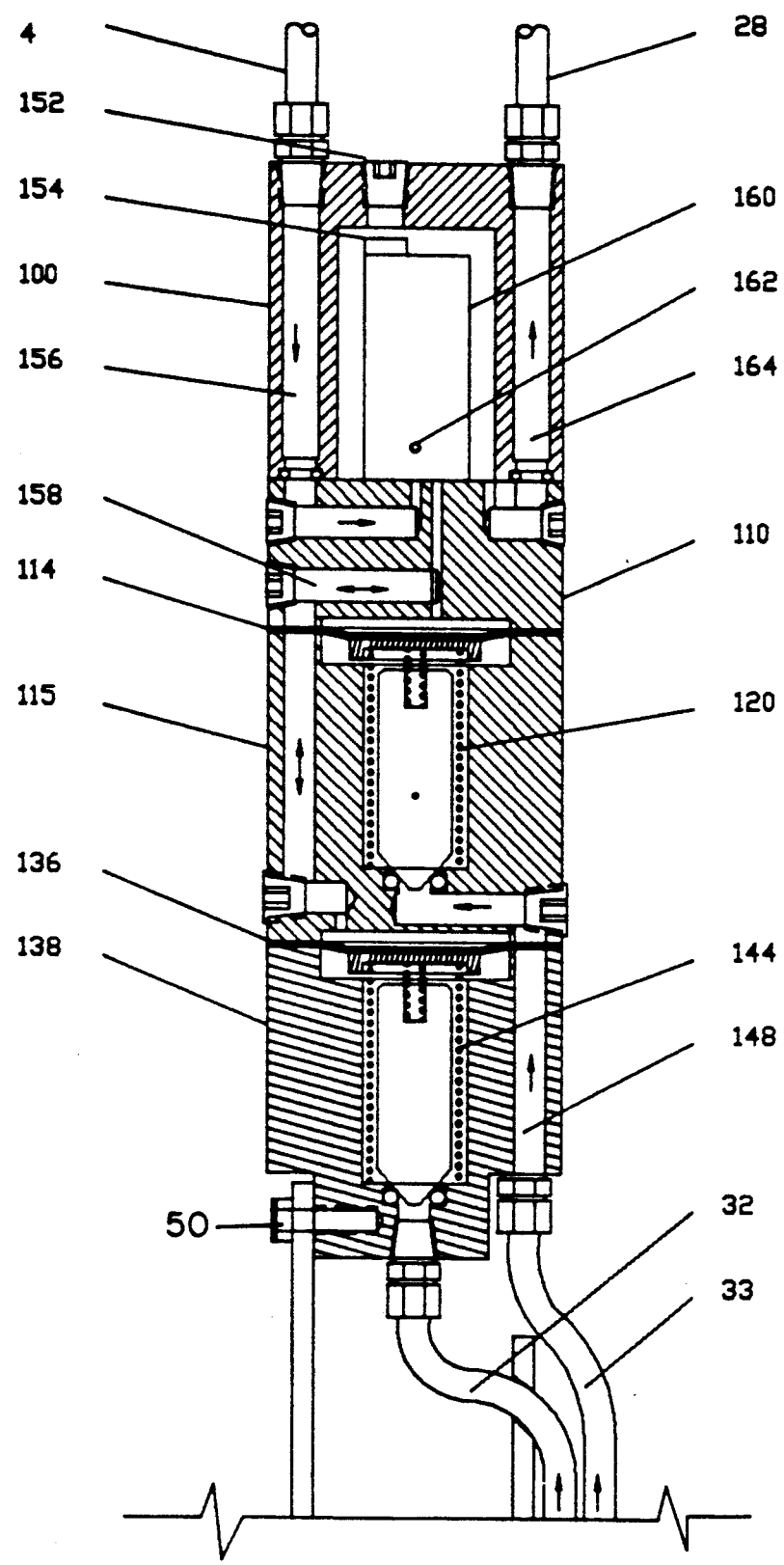
FIG. 5 is an enlarged cross-section of the pump assembly showing the air flow path.

With reference to FIG. 5, which illustrates the air flow paths, compressed air is supplied to the pump from hose 4 through port 156 to the logic valve 160. The valve 160 alternately delivers pulses of compressed air through port 158 and then relieves the pressure in port 158 through a hole 162 in the side of the valve. Air that is released from valve 160 passes through port 164 and hose 28 to be exhausted outside the well. Any moisture that condenses in the air lines will be blown out port 164 with the exhaust air. When port 158 is pressurized, the diaphragms 136 and 114 are forced downward against the springs 120 and 144. When the pressure is relieved from port 158, the springs force the diaphragms 136, 114 upward, displacing air through port 158, and drawing in more fluid into the pump.

Figure 6:
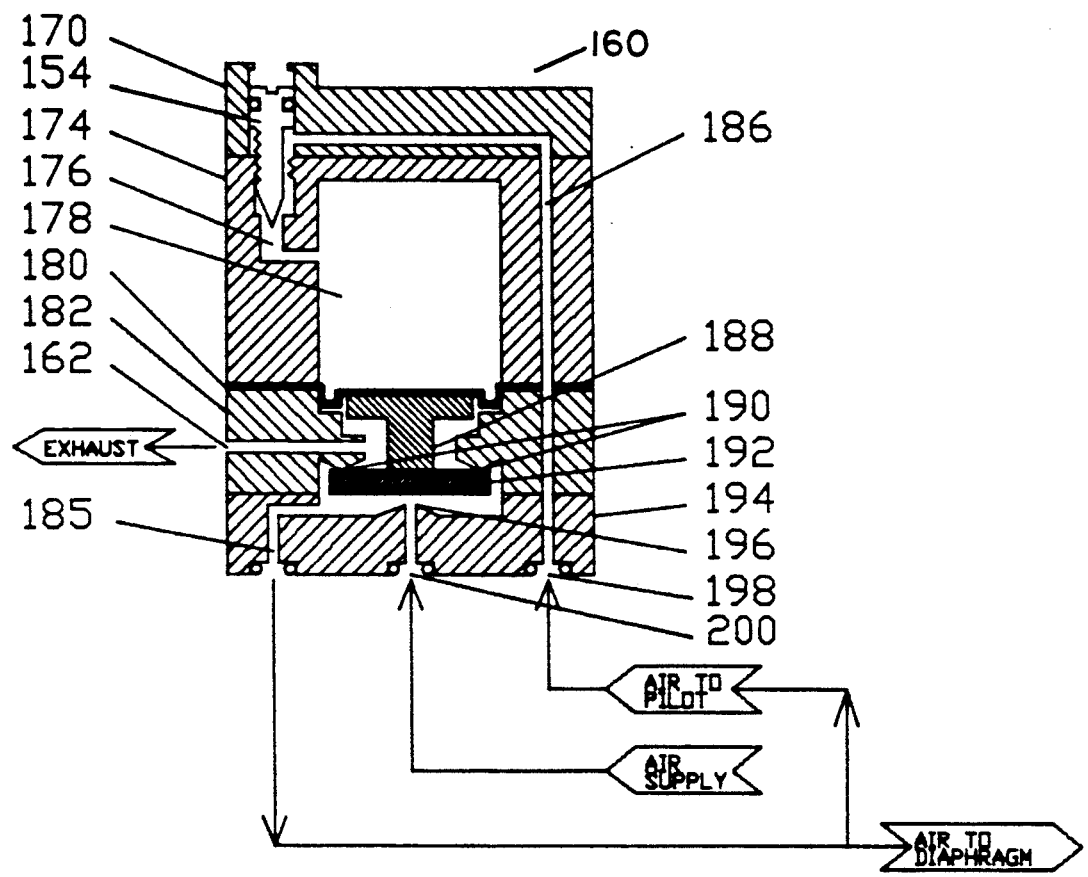
FIG. 6 is an enlarged cross-section of the control valve in the pulse discharge mode.

With reference to FIG. 6, which illustrates the pulse/discharge mode of operation, valve 160 is a snap action poppet valve that is very forgiving of dirt and moisture in the air line. The valve has a needle valve 154 provided for adjusting the pulse rate. The pump housing has a plug 152 (FIG. 5) provided over the needle valve for adjusting the pumping rate. The pumping rate is dependent on the pulse rate, the filling rate, and the discharge rate. However, the pulse rate is not dependent on the position of the diaphragm 114 or 136. During operation, the discharge head pressure due to the liquid in the liquid outlet path from the pump to the surface equipment can vary over a wide range. As the air supply pressure minus the spring force drops below the discharge head pressure, the pumping rate will decrease rapidly as the discharge head pressure increases. Eventually, valve 160 will continue to pulse at a steady rate. The diaphragm 114 or 136 will stall and no liquid will be pumped but since the valve 160 operates continuously (so long as air pressure is supplied) pumping resumes as soon as the diaphragm stall condition is relieved. The diaphragms 114, 136 separate the air from the fluid being pumped. Therefore, the exhausted air outside the well is free from oil vapors and any other hydrocarbon vapors and is thus non-polluting.

Figure 7:
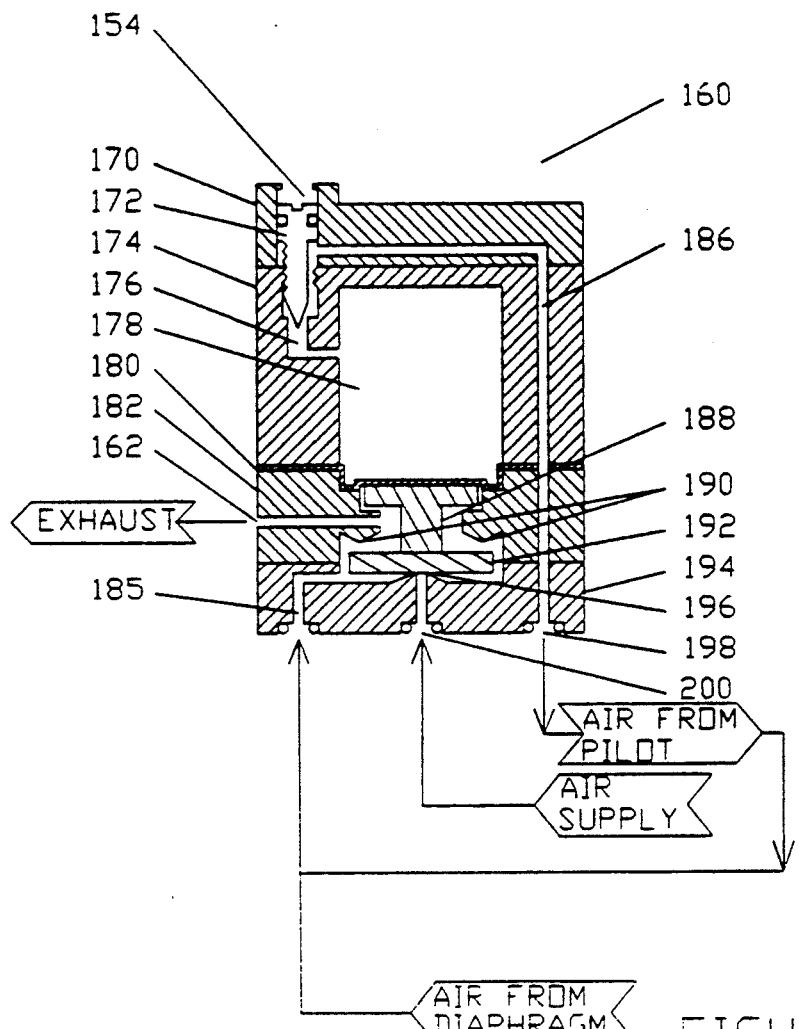
FIG. 7 is an enlarged cross-section of the control valve in the exhaust/fill mode.

Air is supplied to the valve inlet 200 by way of port 156. The air pressure displaces a poppet valve 192 against an exhaust seat 190 preventing air from escaping. Air is allowed to pass to the diaphragms through port 185. Port 158 is also connected to the pilot 198 of valve 160. As long as air is supplied to the diaphragms 114, 136, air is supplied to the pilot 198. The pilot air passes through a port 186 and through needle valve 172 into volume chamber 178. When the pressure in the volume chamber 178 exerts enough force on a diaphragm 180 and an actuator 188 to overcome the force exerted by the supply source against the exhaust seat, the poppet 192 snaps down against the supply seat 196 to the position illustrated in FIG. 7. Because the area of the supply seat 196 is small compared to the area of the diaphragm 180, it takes little pressure in the volume chamber 178 to keep the supply closed off. When the valve 160 is in the exhaust mode illustrated in FIG. 7, air in the volume chamber 178 passes through needle valve 154, port 186, is joined with air from port 158 (FIG. 5), passes through valve port 185, past poppet 192, and out the exhaust 162. When the air pressure in the volume chamber 178 exerts less force on the diaphragm 180, actuator 188, and poppet 192 than the force exerted on the poppet 192 by the supply air 200, the poppet 192 snaps back against the exhaust seat 190, and the cycle starts over.

The invention provides a skimming system which is relatively safe and reliable in operation and is extremely durable in situ. The pump portion of the skimmer is relatively safe in operation since it relies on non-explosive compressed air and the internal diaphragm springs for the pumping action. The arrangement and location of the main pumping diaphragms ensures separation between the compressed air conduits and the liquid conduits, so that no contamination is vented to atmosphere via the compressed air exhaust line. The use of the quick connects and check valves also ensures no fluid leakage during installation, operation, and shutdown, and the use of the ball check valves in the fluid paths permits the passage of relatively large solid contaminants entering the fluid delivery portion of the system to the above-ground apparatus.

The float/filter assembly design ensures that the lighter than water liquids encountered by the inlet portion of the skimmer reliably pass into the interior thereof for passage through the pump portions to the associated equipment at the surface of the earth. In addition, the float/filter assembly is free to follow the level of the lighter than water liquid/water interface by gliding smoothly within the protective slotted shield, even when the apparatus is arranged at an angle with respect to vertical. The careful arrangement of the hose leading from the outlet of the float/filter assembly to the inlet of the lower pump provides limit stops in both the upward and downward directions for the travel of the float/filter assembly without impairing the motion of this assembly over the permitted travel range within the slotted tube. In addition, the provision of the overflow inlet at the upper portion of the filter provides both enhanced withdrawal capability for the lighter than water liquid and also prevents forced penetration of water through the side walls of the filter in the manner described above.

The logic valve arrangement provides long term reliability for the cycling of the liquid pumps, as well as adjustability to the length of the pumping cycle and relatively long operation life. With the logic valve being incorporated in the pump, there is no need for complex above ground pump controls. It is important to note that the continued operation of the logic valve after a diaphragm stall ensures that pumping action will automatically resume after the stall condition is relieved. This also simplifies the nature of the compressed air logic found in known skimming systems and diaphragm pump.

While the above provides a full and complete disclosure of the preferred embodiment of the invention, various modifications, alternate constructions and equivalents may be employed as desired. Therefore, the above description should not be viewed as limiting the scope of the invention, which is defined by the appended claims.

What is claimed is:

1. A skimmer assembly for use in selectively separating lighter than water liquid from water and for pumping at least the lighter than water liquid from the environment of the skimmer assembly to another location, said assembly comprising:
   a pressurized gas operated pump assembly;
   an apertured shield secured to and extending below said pump assembly; and
   a float/filter assembly arranged within said shield for slidable motion therewithin, said float/filter assembly including a buoyant float member having an internal passageway coupled to said pump assembly and a filter member having an outlet coupled to said internal passageway of said float member and a filter element with a wall portion for selectively passing lighter than water liquid thereinto, said float/filter assembly having a buoyancy designed to position said filter element with said wall portion spanning a boundary between water and a lighter than water liquid,
   said pump assembly including a pressure operated control logic valve for controlling the application of an externally supplied pressurized gas to said pump assembly so that said pump assembly only requires a supply of pressurized gas to operate.

2. The invention of claim 1 wherein said filter element wall portion is hydrophobic.

3. The invention of claim 2 wherein said filter member has a pressure relief inlet adjacent said filter element for limiting the pump assembly suction applied to the filter element in order to prevent water from being drawn through said filter element wall portion by overcoming the hydrophobic nature of said wall portion.

4. The invention of claim 1 wherein said skimmer assembly further includes means for providing upper and lower limits to the motion of said float/filter assembly within said apertured shield.

5. The invention of claim 4 wherein said limit providing means includes a flexible hose coupled to said filter member outlet and to said pump assembly.

6. The invention of claim 5 wherein said flexible hose is routed through said apertured shield.

7. The invention of claim 1 wherein said pump assembly comprises a first pump having a liquid inlet coupled to said filter member outlet, a liquid outlet for expelling liquid flowing therethrough, a pressurized gas port coupled to said control logic valve, and a diaphragm for separating the liquid from the pressurized gas.

8. The invention of claim 7 wherein said pump assembly comprises a second pump having a liquid inlet coupled to water in the region of said float/filter assembly, a liquid outlet for expelling water flowing therethrough, a pressurized gas port coupled to said control logic valve, and a diaphragm for separating the water from the pressurized gas.

9. The invention of claim 8 wherein each of said first and second pumps further includes a valve chamber coupled between said liquid inlet and said liquid outlet, a check valve positioned within said chamber and occupying a substantial portion of said chamber, a pressure plate located between one end of said check valve and said diaphragm, a first bias spring for biasing said pressure plate toward said diaphragm, and a second bias spring positioned between said pressure plate and said check valve for biasing said check valve toward said liquid inlet to close said liquid inlet.

10. The invention of claim 9 wherein said first and second pumps are mechanically fastened together in tandem below said control logic valve.

11. The invention of claim 1 wherein said control logic valve includes a housing having a pressurized gas inlet port, a pressurized gas exhaust port, a pressurized gas pump port, a pressurized gas pilot port in fluid communication with said pressurized gas pump port, and a poppet valve located within said housing and having a diaphragm dividing the interior of said housing into first and second chambers, the first chamber being in fluid communication with said pressurized gas pilot port via a pilot valve, the pressurized gas inlet, exhaust and pump ports each having an inner terminus in said second chamber, said poppet valve having a main body portion with a first end coupled to said diaphragm and a second end with a valve member capable of isolating said pressurized gas exhaust port from said pressurized gas inlet and pump ports when in a first position, and further capable of isolating said pressurized gas inlet port said pressurized gas exhaust and pump ports when in a second position.

12. The invention of claim 11 wherein said pilot valve is adjustable.

13. The invention of claim 12 wherein said pump assembly comprises first and second pumps, each having a liquid inlet, a liquid outlet for expelling liquid flowing therethrough, a pressurized gas port coupled to said control logic valve, and a diaphragm for separating the liquid from the pressurized gas, the liquid inlet of said first pump being fluid coupled to said filter member outlet, the liquid inlet of said second pump being fluid coupled to water in the region of said float/filter assembly;

and wherein said control logic valve is mounted within a surrounding housing having a pressurized gas inlet passageway and a pressurized gas exhaust passageway, a first liquid outlet passageway and a second liquid outlet passageway, said pressurized gas inlet and exhaust passageways being fluid coupled respectively to said pressurized gas inlet and exhaust ports of said control logic valve housing, said first and second liquid outlet passageways being coupled respectively to said liquid outlet of said first and second pumps, each of said liquid outlet passageways including a check valve for impeding liquid flow inwardly of said skimmer assembly.

14. The invention of claim 10 wherein each check valve comprises a ball and seat valve; and further including a pair of limit stops each associated to a different one of said check valves for limiting travel of the associated ball.

* * * * *